United States Patent [19]
Kunogi et al.

[11] 3,826,477
[45] July 30, 1974

[54] INJECTION MOLDING MACHINE WITH A VENTING DEVICE

[75] Inventors: Mahito Kunogi, Aichi-ken; Teruo Tanikawa, Showa, both of Japan

[73] Assignee: Kabushiki Kaisha Meiki Seisakusho, Aichi-ken, Japan

[22] Filed: Apr. 10, 1972

[21] Appl. No.: 242,671

[30] Foreign Application Priority Data
Apr. 13, 1971  Japan.............. 46-23359
Apr. 13, 1971  Japan.............. 46-23360

[52] U.S. Cl............... 259/191, 259/5, 425/208
[51] Int. Cl.......... B29b 1/06, B29h 1/10, B01f 7/08
[58] Field of Search......... 425/207, 208; 259/9, 10, 259/25, 26, 45, 46, 109, 110, 191–193, 5

[56] References Cited
UNITED STATES PATENTS
| | | | |
|---|---|---|---|
| 2,595,455 | 5/1952 | Heston................ | 259/191 |
| 3,193,877 | 7/1965 | Edwards.............. | 259/191 |
| 3,263,276 | 8/1966 | Maier................. | 425/208 |
| 3,633,880 | 1/1972 | Newmark............. | 425/208 |
| 3,685,804 | 8/1972 | Stansfield............ | 259/10 |
| 3,737,151 | 6/1973 | Schaeffer et al...... | 259/5 |

FOREIGN PATENTS OR APPLICATIONS
| | | | |
|---|---|---|---|
| 1,432,146 | 12/1966 | France............... | 425/208 |

*Primary Examiner*—John W. Huckert
*Assistant Examiner*—Stuart S. Levy
*Attorney, Agent, or Firm*—Browdy & Neimaric

[57] ABSTRACT

An injection molding machine having a vent opening on the heating barrel is disclosed which eliminates the clogging of the vent opening by the melt. This is attached by a step or steps in the size of the outer diameter of the screw and also steps in the size of the inner diameter of the barrel. The larger diameter portion of the barrel is located forwardly of the smaller diameter portion. The same is true of the screw. The vent opening is located in the portion of the device with a large barrel diameter but a small screw diameter.

6 Claims, 3 Drawing Figures

INJECTION MOLDING MACHINE WITH A VENTING DEVICE

This invention relates to injection molding machines for use with plastics and more particularly such machines having a vent opening on a heating barrel in which a screw rod can rotate and reciprocate (the term "vent machine" is used hereinafter to designate any of the machines mentioned above).

For plastics processing machines such as extruders and injection molding machines, it has been well-known that removing moisture or volatiles from plastic material is very important for getting products of good quality. Two principal methods have been developed to remove moisture or volatiles which adhere to plastic material (usually pellet form) contained therein or yielded therefrom; one is to remove such vapour before the plastic material is melted (mainly in the hopper of the machine) and the other is removal after it is melted (usually from a vent opening in the heating barrel). The latter method is more effective than the former, however, there is a vital disadvantage. This is the fact that clogging of the vent opening with plastic melt is liable to occur and is almost unavoidable in case of injection molding machines in which a screw rotates intermittently, because no drag flow of melt is available when the screw stops rotating. Another disadvantage is that hung-up material around the vent opening, although it may not accumulate enough to clog the opening, tends to degrade or to result in unfavorable colored products.

A few prior art methods have been disclosed to eliminate such disadvantages in the case of injection molding machines. For example, one method is to provide a valve mechanism to the vent opening which is to open during the plasticizing period but to close while the screw stops rotating. Another invention is to provide a small screw and a cylinder therefor in the vent opening so that the melt flown out from the vent is to be pushed back by rotation of said small screw.

The present invention can fundamentally avoid such disadvantages without necessitating additional equipment and moreover with ease and sureness, this can be attained by making a step or steps in size to the outer diameters of the screw and doing the same to the inner diameters of the barrel.

Therefore, the principal object of our present invention is to provide an improved but simplified venting device suitable for an injection molding machine.

Another object of this invention is to provide an improved venting device which allows no hung-up or degraded melt for use with injection molding machines where intermittent rotation of the screw is essential.

A further object of this invention is to provide an improved venting device suitable for injection molding machines without sacrificing the plasticizing capacity.

The above and other objects, features and advantages of the present invention will become more readily apparent from the following description of some of its embodiments, reference being made to the accompanying drawings in which.

Figure 1:
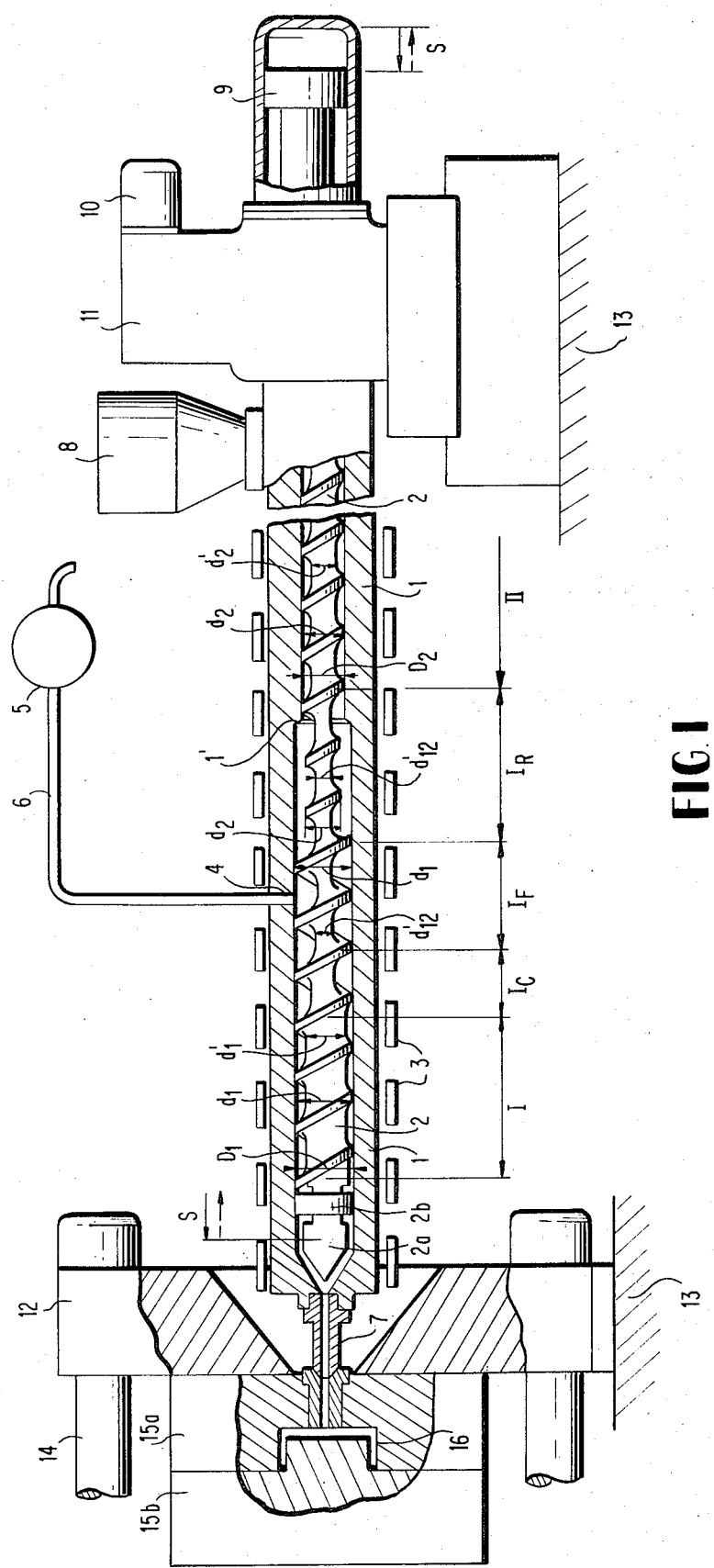
FIG. 1 is a vertical sectional view of an embodiment of the present invention, a part of an injection molding machine of an in-line screw type, or reciprocating screw type.

A heating cylinder or barrel in FIG. 1 has a step 1' before which a bigger inner-diameter $D_1$ is bored and after which a smaller diameter $D_2$. A screw 2 has also one-stepped dual outer-diameters; the bigger $d_1$ is slidably and rotatably mounted in the barrel part of inner diameter $D_1$ to fit snugly therewith and similarly the smaller $d_2$ with $D_2$. The screw 2 has a single thread of a constant pitch throughout the whole threaded part.

The relation between these diameters is as follows:

$$D_1 > D_2 \qquad (1)$$

$$d_1 > d_2 \qquad (2)$$

$$D_1 = d_1 + \alpha_1 \qquad (3)$$

and $$D_2 = d_2 + \alpha_2 \qquad (4)$$

whereas $\alpha_1$ and $\alpha_2$ designate a conventional clearance allowable between a heating barrel and a screw diameter respectively. The diameter at the screw root or the channel bottom is varied according to the position as illustrated in FIG. 1, i.e., $d_1'$ at the forward part, $d_2'$ at the rearward part and $d'_{12}$ at the transiting zone and the relation between these diameters is $$d'_1 > d'_2 > d'_{12} \qquad (5)$$

The screw has various diameters at various parts, so zone symbols are designated to such parts for convenience, referring to FIG. 1.

I, $I_C$, $I_F$, $I_R$ and II designate respectively the part having outer diameter $d_1$, $d_2$ and root one $d'_1$, $d'_2$ ... as summarized in Table 1.

TABLE 1

| Zone Symbols | I | $I_C$ | $I_F$ | $I_R$ | II |
|---|---|---|---|---|---|
| Outer Diameters | $d_1$ | $d_1$ | $d_1$ | $d_2$ | $d_2$ |
| Root Diameters | $d'_1$ | $d'_1 \to d'_{12}$ | $d'_{12}$ | $d'_{12}$ | $d'_2$ |

The heating barrel can be heated by a number of bank heaters 3 and the temperature can be controlled by zones the same as on a conventional barrel. An opening 4 is bored at an upper part of the largely bored $D_1$ barrel before the step 1' and more particularly at a position confronting the screw zone $I_F$ or $I_R$, regardless of variation of the relative position by the reciprocating stroke of the screw. In other words the placement of opening 4 must be selected in a range suitable to be able to confront with said zone $I_F$ or $I_R$ when the screw 2 is in the forwardmost position, as in FIG. 1, and also when the screw recedes by the maximal stroke S. The vent opening 4 is connected to a vacuum or a negative pressure source 5 by a conduit 6.

In operation, material in a hopper 8 is transferred into cylinder 1 by the rotation of the screw 2, which rotation is accomplished by a hydraulic or an electric motor 10 through a train of reduction gears in a gear case 11. The material is melted with the help of heater bands 3 by the end of the zone II.

The melt being transferred from the zone II to the zone $I_R$ undergoes considerable reduction of pressure due to increase of the sectional area of the screw by changing the root diameter from $d'_1$ to $d'_{12}$, and far more reduction of pressure by passing the step 1' of the barrel 1 because of rapid increase of the sectional area of the screw channel due to the change of the inner diameter from $D_2$ to $D_1$. The drag flow at the zone $I_R$ confronting the larger inner diameter $D_1$ may not be calculated because there is a conspicuous gap between the screw outer-diameter $d_2$ and the barrel inner-diameter $D_1$, however, the theoretical drag flow at the zone $I_F$ is maximum in this case because the screw outer diameter $d_1$ is maximum and the root diameter $d'_{12}$ is smallest by inequalities 1 and 5. That is why melt can be dragged forward powerfully without fear of "ventup". Volatiles are sucked from the vent opening 4 by a vacuum pump 5 through a duct 6.

Vented melt is transferred forward to be compressed a little in zone $I_C$ and enters the second metering zone I, the theoretical drag flow at zone I is smaller than that of zone $I_F$, but larger than that of the zone II. In actual operation the conveying rate of melt (grams per revolution of the screw) at the zone I usually must exceed that at the zone II, and equal in the steady state because no surplus melt is allowed to be accumulated between the two zones I and II. The melt being transferred forward by the second metering zone I passes through a conventional ring-shaped check valve $2b$ and accumulates in front of the screw head $2a$.

When a certain amount of melt is accumulated, a conventional signal of a limit switch (not shown) starts the injection motion of the screw 2 with a hydraulic piston 9 and the melt is injected through a nozzle 7 and into a cavity 16, which is constructed by matching two dies $15a$ and $15b$ in a conventional clamping unit comprising a stationary plate 12, tie bars 14 etc. on a machine bed 13.

Figure 2:
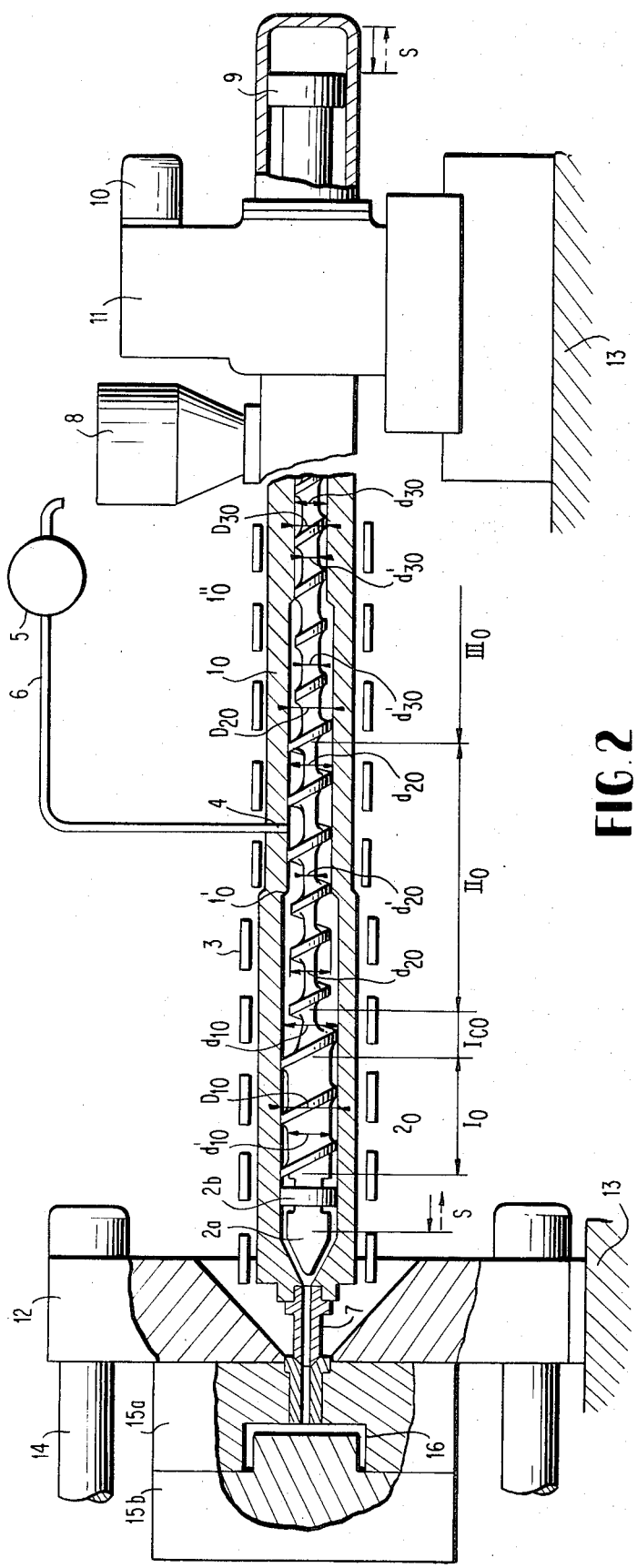
FIG. 2 is a vertical sectional view of another embodiment of the present invention.

Another embodiment of this invention is shown in FIG. 2. The principal features of this embodiment are as follows, referring to FIG. 2:

a. The heating barrel 1 has dual-stepped three diameters, $D_{10}$, $D_{20}$ and $D_{30}$ respectively from front to rear by two steps, the front step $1'_o$ and the rear $1''_o$.

b. The screw $2_o$ has also dual-stepped three outer-diameters, $d_{10}$, $d_{20}$, $d_{30}$ and root diameters $d'_{10}$, $d'_{20}$, $d'_{30}$ respectively from front to rear.

c. The screw $2_o$ has a single thread of a constant pitch throughout the whole threaded part.

d. The relation between zone symbols and screw diameters is summarized in Table 2

Table 2

| Zone Symbols | $I_o$ | $I_{co}$ | $II_o$ | $III_o$ |
|---|---|---|---|---|
| Outer Diameters | $d_{10}$ | $d_{10} \rightarrow d_{20}$ | $d_{20}$ | $d_{30}$ |
| Foot Diameters | $d'_{10}$ | $d'_{10} \rightarrow d'_{20}$ | $d'_{20}$ | $d'_{30}$ |

The venting opening 4 may be located on the part of barrel diameter $D_{20}$ or on the rear part of barrel diameter $D_{10}$, where the hole 4 can be confronting the zone $II_o$ of the screw $1_o$. A typical example of this embodiment has the following dimensions:

| | | |
|---|---|---|
| $d_{10}$ | = | 60.0 mm. |
| $d'_{10}$ | = | 50.0 mm. |
| $d_{20}$ | = | 55.0 mm. |
| $d'_{20}$ | = | 34.0 mm. |
| $d_{30}$ | = | 50.0 mm. |
| $d'_{30}$ | = | 44.0 mm. |

Figure 3:
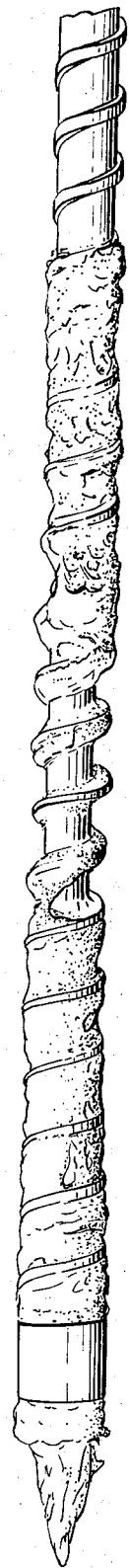
FIG. 3 is an elevational view of a screw withdrawn from a barrel, both of which belong to an embodiment according to this invention. Plastic is shown on the screw in a state quickly cooled to be frozen just after having plasticized a certain amount of plastic material.

$D_{10} = 60.0$ mm. $+ \alpha_1$
$D_{20} = 55.0$ mm. $+ \alpha_2$
$D_{30} = 50.0$ mm. $+ \alpha_3$ Whereas $\alpha_1$, $\alpha_2$ and $\alpha_3$ are conventional clearances between the barrel inner diameter and the screw outer diameter respectively FIG. 3 shows a screw having the above-mentioned dimension when it was suddenly cooled and drawn out from the barrel just after it had plasticized 340 cm³ of thermoplastic material, ABS. From this figure, the status of melt advancing along the flight of the screw may be clearly understood. Especially note that the part of the barrel having inner diameter $D_{20}$ and confronting screw zone $II_o$ is most suitable to locate the vent opening 4.

According to the present invention many advantages are observed; however, at least the following ones must be discussed a little more in detail:

1. perfect prevention of vent up,
2. elimination of degradation or discoloration due to hanging-up of material around the vent opening,
3. no decreasing of plasticizing capacity.

At first to prevent vent up, it is well-known and commonly carried out to make screw-channel depth deep just after the first-stage metering zone in order to decrease melt pressure. However, this practice is limited because necessary screw strength does not allow excessive deepening of channel depth.

On the contrary there is no limitation to the decrease of melt pressure in the present invention because the barrel diameter can be enlarged by any amount at the predetermined place, and that makes drag flow capacity before the vent increase by any degree, enough to prevent vent-up, and therefore there is no need of excessive deepening of channel depth. For example in the embodiment mentioned above the ratio of theoretical drag flow between the zone $II_o$ and $I_o$ is 2.6 to 1 and this ratio is obtained only by increasing as much as 10 percent in the outer diameter and decreasing 20 percent in the root diameter.

Next, due to enlarging of the outer diameter of the screw, vent-up is prevented by not only the reason mentioned above but also by making the space around the zone $II_o$ of higher negative pressure during the injection period, because displacement volume of the zone $I_o$ exceeds that of the zone $III_o$. The effect is very important because vent-up or hung-up material around the vent opening has occured in conventional vent machines most during injection periods when a high pressure on melt increases back flow of melt, in spite of using the ring valve.

The third merit is that the high venting effect can be obtained without sacrificing any degree of plasticizing capacity. In conventional vent machines it is almost mandatory to throttle the melt passage at the metering zone on the first stage in order to make larger the pressure drop in the venting space. That is the main reason why the plasticizing capacity is sacrificed. In the case of the present invention the venting effect has on the contrary no relation with the plasticizing capacity because no throttling is necessary. This is very important as the current high productive machines require more and more plasticizing capacity.

Many other advantages or favorable results accompanied by this invention have been noted such as good appearance of moldings, increase of one shot volume, and no need of pre-drying which is hazardous but essential to moisture absorbing materials, ABS, nylon, etc. Many of these advantages, except an increase of shot capacity, are common to the conventional vent machines, also. The advantages unique to the present invention, however, derive mainly from the idea that the inner diameter of the heating barrel is enlarged covering the position of the vent opening and also the screw rotatable and reciprocable therein has an enlarged diameter on the forward portion thereof. The conventional practice of reducing the root diameter of the screw on a certain range confronting the vent opening throughout the whole injection stroke is also effective to this invention in a meaning of giving an additional effect.

According to the present invention the vent effect is high enough to produce moldings of superior quality even in case the vent opening is kept in a very low degree of vacuum such as a fluid Venturi or jet, which is suitable to induce smelling or toxic vapor or gas yielding from the melt.

What is claimed is:

1. An injection molding machine having a front end through which the material to be molded is injected into a mold and a rear end through which the material to be molded is fed to the injection molding machine comprising:

a heating barrel having two sections having different inner diameters, the larger inner diameter being at the front end and the smaller inner diameter being at the rear end;

a screw having a screw thread of a single pitch and having two sections having different outer thread diameters said larger thread diameter being at the front end and entirely within said larger inner diameter section of said barrel and the smaller thread diameter being at the rear end and overlapping the portion of said barrel between said larger and smaller inner diameter sections, said screw being fitted rotatably and reciprocably within said barrel;

an opening located through the section of said barrel having a larger inner diameter which surrounds the section of said screw having a smaller thread diameter for venting gases from material being injection molded passing through said barrel;

means for rotating said screw; and means for reciprocating said screw.

2. An injection molding machine having a front end through which the material to be molded is injected into a mold and a rear end through which the material to be molded is fed to the injection molding machine, comprising:

a heating barrel having at least two sections having different inner diameters, the larger inner diameter being at the front end and the smaller inner diameter being at the rear end;

a screw having a screw thread of a single pitch and having at least two sections having different outer thread diameters and three sections having different root diameters, said larger thread diameter being at the front end and the smaller thread diameter being at the rear end, and wherein the largest of said root diameters is at the end of said screw which has the larger outer thread diameter, the middle diameter root is at the other end of said screw which has the smaller outer thread diameter and the smallest of said root diameters is located between the other two root diameters and overlapping the sections of said screw having differing outer thread diameters said screw being fitted rotatably and reciprocably within said barrel;

an opening located through the section of said barrel having a larger inner diameter for venting gases from material being injection molded passing through said barrel;

means for rotating said screw; and means for reciprocating said screw.

3. An injection molding machine in accordance with claim 2 wherein:

said opening is located in said barrel at that section of said screw having the smallest root diameter.

4. An injection molding machine having a front end through which the material to be molded is injected into a mold and a rear end through which the material to be molded is fed to the injection molding machine, comprising:

a heating barrel having three sections having different inner diameters, the largest inner diameter being at the front end and the smallest inner diameter being at the rear end;

a screw having a screw thread of a single pitch and having three sections having different outer thread diameters and three sections having different root diameters, the largest thread diameter being at the front end and the smallest thread diameter at the read end, and wherein the largest of said root diameters is at the front end, the middle diameter root is at the rear end and the smallest of said root diameters is therebetween, said screw being fitted rotatably and reciprocably within said barrel;

an opening located through the section of said barrel having a larger inner diameter for venting gases from material being injection molded passing through said barrel;

means for rotating said screw; and means for reciprocating said screw.

5. An injection molding machine in accordance with claim 4 wherein:

said opening is located in said barrel at that section of said screw having the smallest root diameter.

6. An injection molding machine in accordance with claim 4 wherein:

the sections of said screw of differing root diameters at the front, middle and rear of said screw, correspond to the sections of said screw of differing outer diameter and wherein the section of said screw having the smallest root diameter overlaps the largest and middle sections of said barrel and the section of said screw having the smallest outer diameter overlaps the middle and smallest sections of said barrel.

* * * * *